Nov. 30, 1965  W. N. TORPEY  3,220,945
METHOD AND APPARATUS FOR SEWAGE TREATMENT AND DISPOSAL
Filed March 1, 1963  6 Sheets-Sheet 1
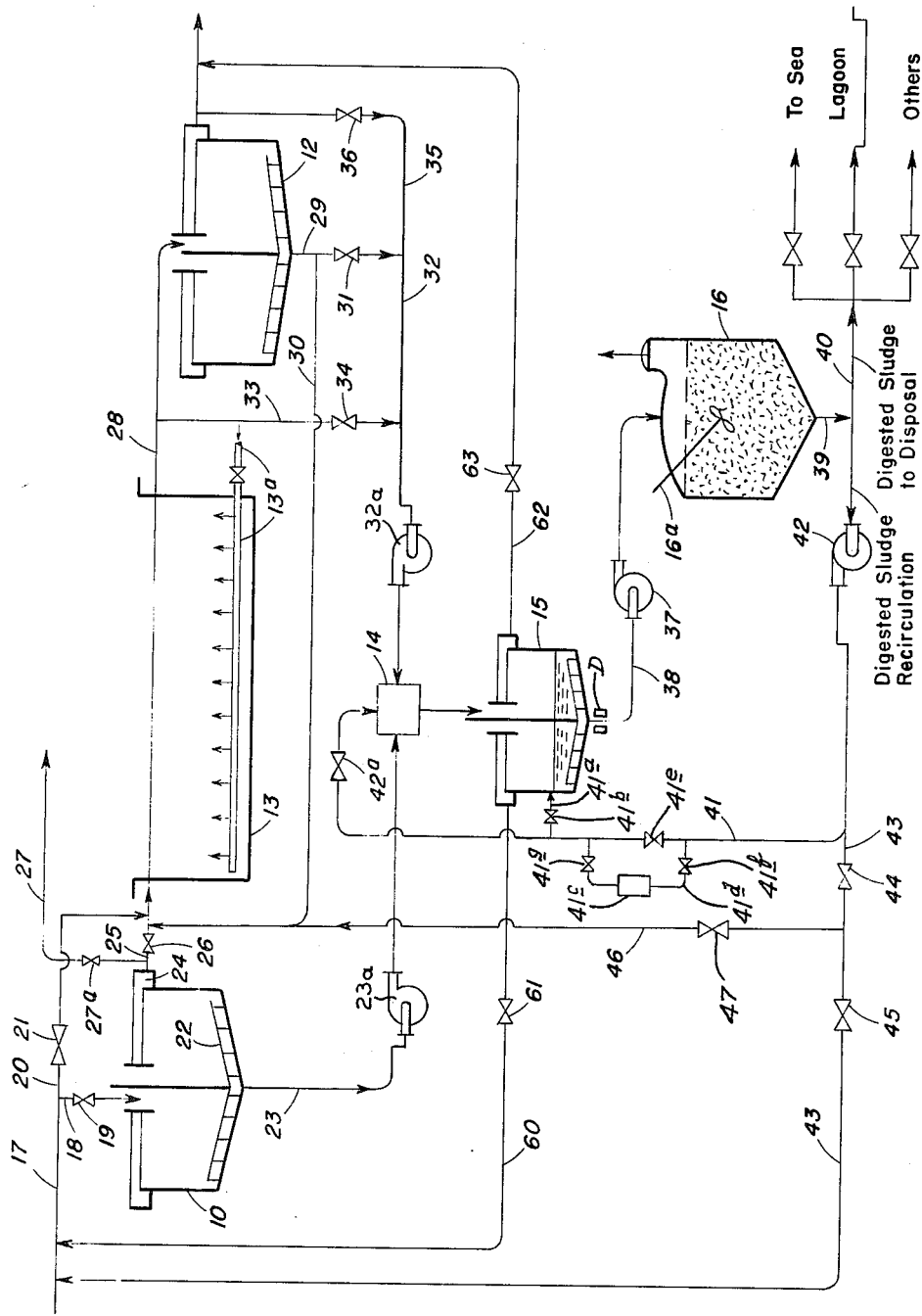
Fig. I.
INVENTOR.
Wilbur N. Torpey
BY Theodore M. Jablon
ATTORNEY Nov. 30, 1965   W. N. TORPEY   3,220,945
METHOD AND APPARATUS FOR SEWAGE TREATMENT AND DISPOSAL
Filed March 1, 1963
6 Sheets-Sheet 4

Digestion of thickened raw Sludge without Recirculation

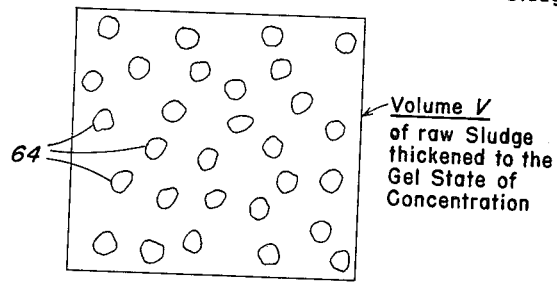

Fig. 5

Volume *V* of raw Sludge thickened to the Gel State of Concentration

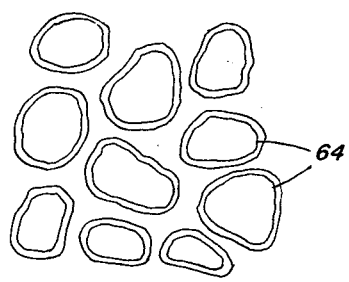

Fig. 5A.

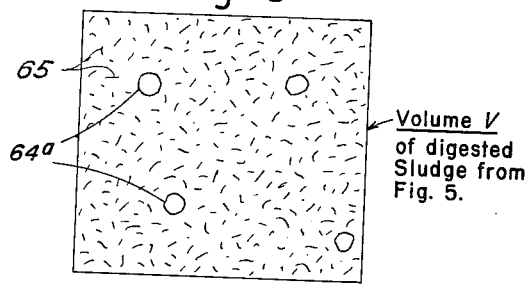

Fig. 6.

Volume *V* of digested Sludge from Fig. 5.

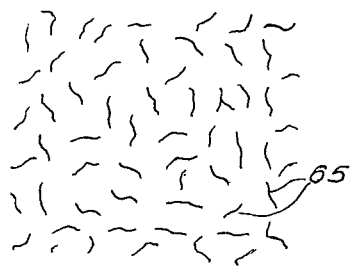

Fig. 6A.

Digestion of thickened Sludge Mixture with Recirculation

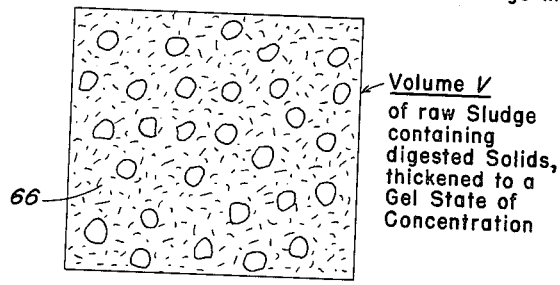

Fig. 7.

Volume *V* of raw Sludge containing digested Solids, thickened to a Gel State of Concentration

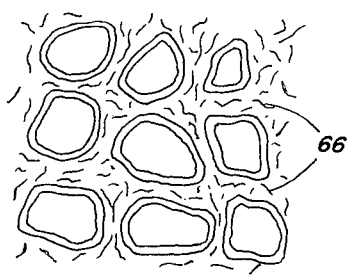

Fig. 7A.

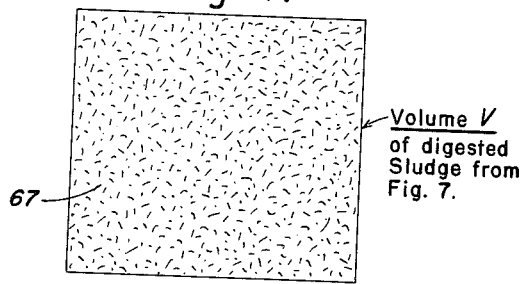

Fig. 8.

Volume *V* of digested Sludge from Fig. 7.

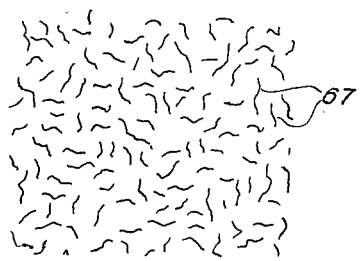

Fig. 8A.

INVENTOR
Wilbur N. Torpey
BY Theodore M. Jablon
ATTORNEY

Nov. 30, 1965 W. N. TORPEY 3,220,945
METHOD AND APPARATUS FOR SEWAGE TREATMENT AND DISPOSAL
Filed March 1, 1963 6 Sheets-Sheet 5

INVENTOR.
Wilbur N. Torpey
BY
ATTORNEY

United States Patent Office 3,220,945
Patented Nov. 30, 1965

3,220,945
METHOD AND APPARATUS FOR SEWAGE
TREATMENT AND DISPOSAL
Wilbur N. Torpey, 49—23 Hanford St., Douglaston, N.Y.
Filed Mar. 1, 1963, Ser. No. 262,060
22 Claims. (Cl. 210—5)

This invention relates to the anaerobic digestion of putrescible waste sludges whereby the digestible matter in the sludges is converted into gas, leaving for disposal a digested sludge containing relatively inert solids and liquid.

This invention is concerned with the problem of minimizing the cost of handling the digested sludge derived from a sewage clarification operation, by removing significant amounts of water from the digested sludge in order to reduce the volume of the sludge going to disposal.

The problem of sludge volume reduction is altogether a complex one, since the digested sludge obtainable from a properly operated digestion systems will resist shrinkage and due to its hydrophylic nature will not yield any significant amounts of water unless subjected to mechanical or chemical treatment operations. Among these are centrifugation employing thousands of gravities to effect the separation, or the use of chemical coagulants followed by vacuum filtration, all with their attendant operating problems and high installation and operating costs.

The invention aims to attain a marked reduction in the volume of digested sludge going to disposal in a manner which is simple and readily controllable, and without extra cost.

According to the invention, raw sewage sludge derived from a clarification operation is dewatered or thickened while having incorporated in the mass of thickened raw solids substantial quantities of digested solids derived from recirculated digested sludge.

When this dewatered sludge mixture is fed to the digester, there will result a digested sludge of higher concentration than was heretofore attainable, and the sludge volume going to disposal is thereby greatly reduced.

In connection with this invention, reference may be had to the patent to Torpey, No. 2,850,448, which teaches how to control the thickening of dilute raw sludges in a tank having mechanical sludge collecting and raking means, to effect the removal of water to the extent where the raw sludge reaches a gel state of concentration. This is the state where further minor increases in solids concentration will produce disproportionately large increases in sludge viscosity and corresponding changes in the behavior of this sludge. This gel contains substantially no freely releasable liquor. This gel state moreover is a condition wherein the sludge appears and behaves like a plastic mass which strongly resists any further release of water.

Such thickening is representable by a thickening behavior curve plotted with the solids detention time on the abscissa and the solids concentration on the ordinate, which curve comprises a steeply ascending linear portion, an intermeditae bend portion, and a shallow outer end portion, all three portions merging sequentially with one another. Graphically speaking, this thickening operation is carried out at or above the bend portion of the curve where the thickening process will produce a sludge of uniformly high solids concentration in the gel state and where freely releasable liquor is no longer present. When sludge in that state of concentration was subjected to digestion and agitation, there resulted a digested sludge which in turn was substantially free from supernatant liquor. Digestion was thus achievable in a single digester tank under agitation producing an almost fully digested sludge. The volume of the digested sludge going to disposal from that tank was substantially equal to the volume of the digested sludge obtained from a well operated two-stage digestion system, which volume represents the minimum heretofore achievable to be handled.

A major reduction of the volume of digested sludge below the aforementioned minimum is attainable by the invention in a manner which is simple and readily controllable and without extra cost. In one embodiment, this reduction is attainable by thickening the raw sludge to gel concentration in the presence of substantial quantities of digested sludge solids, and subjecting the resulting thickened mixture to digestion, producing a final digested sludge reduced in volume to only a fraction of that otherwise obtainable if the same amount of raw sludge were thickened alone.

In this invention, a thickening zone operates in circuit with the digestion system, with thickened sludge mixture of raw and digested solids being transferred substantially continuously to the digester, and with a substantial proportion of the displaced digested sludge being recirculated so that the digested solids are admitted into the thickening zone. Under these conditions combined with the kneading effect of the raking blades of the thickener, the digested solids were made to incorporate themselves into the mass of the raw sludge gel without substantial increase in the volume of the thickened sludge. Consequently, after digestion of this thickened sludge mixture, the resulting digested sludge volume was reduced substantially in proportion to the amount of digested sludge recirculated.

It was found that recirculation of digested sludge solids could be extended up to about 66% or two thirds of the sludge volume leaving the digester with concurrent decreases in the sludge volume going to disposal.

In starting the operation, in the preferred embodiment dilute raw sludge obtainable from the clarification treatment is subjected to thickening. Raw sludge thus thickened preferably to the gel state of solids concentration may be transferred from the sludge bed in the thickener substantially continuously to the digestion system until digestion equilibrium is established, while discharging digested sludge having the aforementioned limited solids concentration. The thickening operation to attain the gel state of concentration of the raw sludge alone may be carried out substantially in accordance with the aforementioned Torpey teachings.

If the recirculation of digested sludge is then initiated at a chosen rate, there will result a substantial reduction in volume of the digested sludge going to disposal, by way of incorporating digested sludge solids into the interstices of the raw solids being thickened to the gel state of concentration. This gel state of the thickened mixture is representable by the bend portion of a sludge thickening behavior curve resembling the thickening curve for the corresponding type of raw sludge alone.

With recirculation continuing, the operation will gradually reach another state of operating equilibrium when the solids concentration of the digested sludge discharging from the digester attains its final value. That is to say, the volume of digested sludge going to disposal has thus been markedly decreased, and the cost of handling has been minimized.

Another important aspect of the invention was found in the fact that recirculation of digested solids under the above conditions produced a thickened sludge mixture of lower viscosity, greater homogeneity and higher solids concentration although having gel characteristics, as compared to the thickened raw sludge alone. This thickened sludge mixture was found to offer lower flow resistance in the pipes and pumps, as well as cleaner operation of the pipes and valves unhampered by grease deposits and accumulations.

Furthermore, the recirculation rate may be adjusted so as to compensate for seasonal mixed sludge viscosity changes. However, the extent to which the recirculation rate can be increased is sharply limited inasmuch as it was found that beyond a critical rate there was a disproportionately large increase in the thickening tank capacity required. Eventually, with further increases of recirculation, there was a precipitous drop in the concentratability of the sludge itself.

It was furthermore found that the effective detention time of the raw gasifiable solids undergoing digestion was increased substantially. As a consequence, losses of gasifiable matter in the digested sludge going to disposal were reduced to only a fraction of the losses in the digested sludge derived from the thickened raw sludge alone. Thus the invention produced a more fully digested sludge.

Other features and advantages will hereinafter appear.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

FIG. 1 is an example of a flowsheet of a sewage treatment plant illustrating various embodiments of the invention featuring the recirculation of digested sludge solids;

Figure 11:
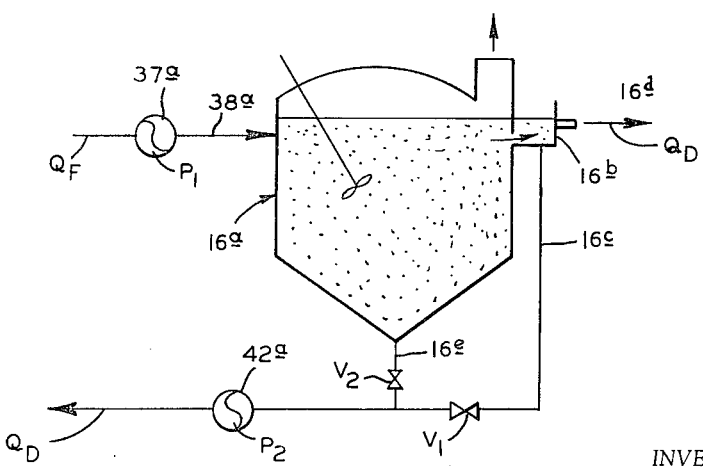
Figure 9:
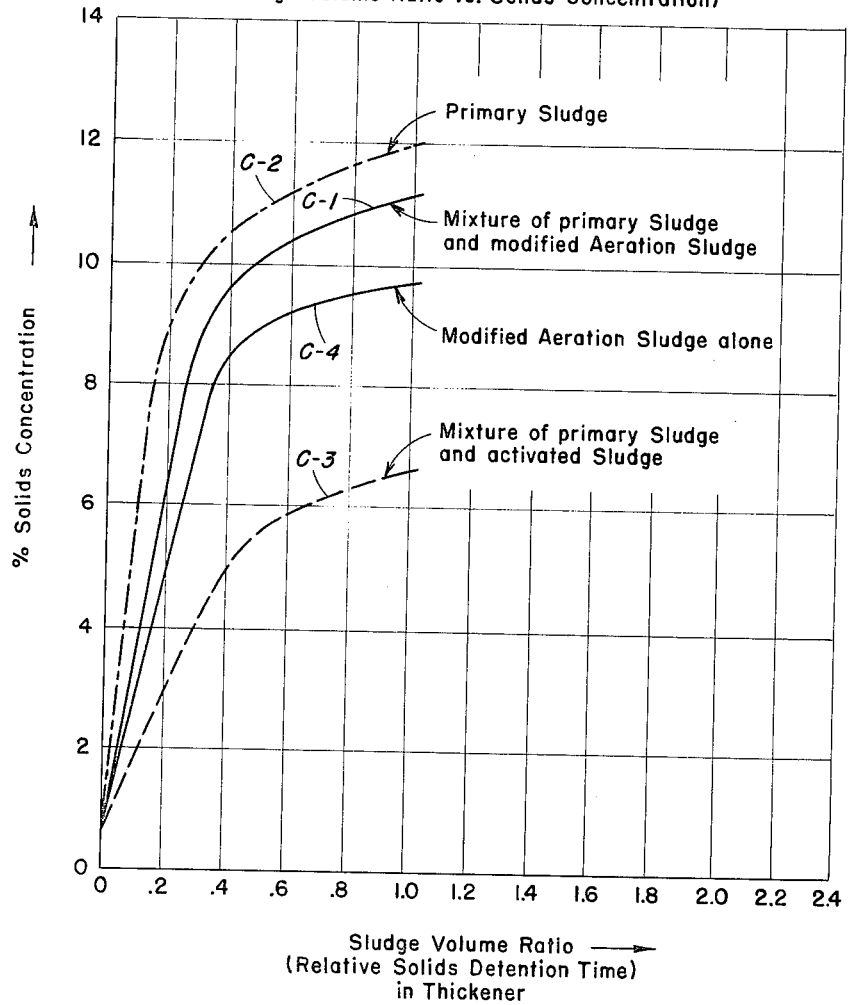
Figure 10:
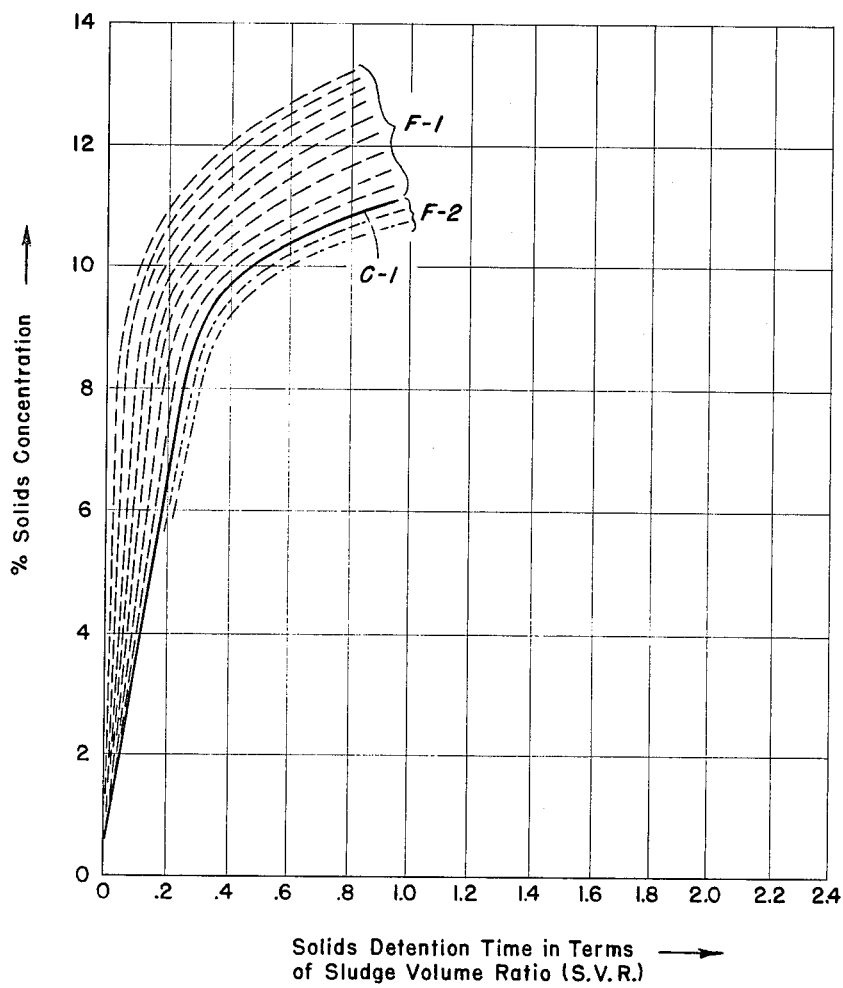

FIG. 5 diagrammatically illustrates a given volume of raw sludge thickened to the gel state of concentration of the raw solids;

FIG. 5a is a greatly enlarged diagrammatic detail view taken from FIG. 5 of the raw solids in the gel state at the respective concentration;

FIG. 6 diagrammatically shows the sludge volume of FIG. 5, after digestion, containing the corresponding amount of digested sludge solids;

FIG. 6a is a greatly enlarged diagrammatic detail view taken from FIG. 6 of the digested solids at the respective concentration;

FIG. 7 diagrammatically shows the sludge volume of FIGS. 5 and 6, with the raw solids thickened to a concentration substantially the same as in FIG. 5, and with recirculated digested solids interstitially incorporated;

FIG. 7a taken from FIG. 7, is a greatly enlarged diagrammatic detail view of the mixture of the raw solids with the digested solids having interstitially incorporated;

FIG. 8 shows the sludge volume of FIG. 7, after digestion of the raw solids, representing the increased digested solids concentration;

FIG. 8a taken from FIG. 8 is a greatly enlarged detail view of the combined digested solids;

FIG. 9 shows thickening behavior curves of various types of raw sludges, illustrating the gel state of solids concentration;

FIG. 10 shows mixed sludge thickening behavior curves illustrating the effects of recirculation of digested sludge upon the solids concentration;

FIG. 11 illustrates means for controlling the proportion of digested sludge diverted for recirculation relative to the undiverted portion going to disposal.

As exemplified in FIG. 1 the invention may be embodied in the flowsheet of a sewage treatment system which provides so-called complete treatment, that is treatment through primary and secondary clarification phases. In this treatment system raw sludge from a primary clarifier 10 is combined or mixed with aerobically treated biological sludge obtained from a secondary or final clarifier 12, and the mixture of both sludges is subjected to anaerobic digestion producing the substantially inoffensive digested sludge along with gas resulting from the bacterial conversion of a certain portion of the sewage matter.

The primary raw sludge represents the heavier fraction of the sewage solids delivered from the primary clarifier and constituting about ⅓ to ⅔ of the total suspended solids in the raw sewage delivered to the plant.

The secondary sludge is derived by treatment of the overflow of the primary clarifier, carrying the non-settleable portion of the sewage solids along with sewage matter in solution. This overflow or primary effluent is subjected to biological treatment in the presence of compressed air carried out in a suitable aerobic treatment system herein exemplified by the aeration treatment tank 13.

As the primary effluent with its colloidal and dissolved matter passes through the aeration tank, it is subjected to aeration in the presence of previously activated biological flocs. Most of the suspended, colloidal and dissolved matter is thus coagulated and rendered settleable in a secondary clarifier yielding a digestible biological or secondary sludge while final clarified effluent passes from the settling tank.

Examples of aerobic treatment systems are the conventional activated sludge treatment process conducted in an aeration tank as shown, step aeration treatment whereby the raw feed is introduced at various points spaced from one another along the length of the aeration tank, high-rate activated sludge treatment also known as modified aeration providing for a shortened period of intense aeration, and trickling filter treatment in its various forms including for example conventional trickling filter operation, bio-filtration, and high-rate filtration.

In the present embodiment raw primary and secondary sludges both of which are putrescible, may be combined in a mixing station 14. The mixed sludges may then be subjected to concentration in a sedimentation type of thickener 15 (note also the construction of such a thickener in FIGS. 2 and 3) where the thickening is carried out under specially controlled conditions causing the dilute sludge mixture to be thickened to a state of gel concentration where freely releasable liquor is substantially no longer present, such as will be furthermore described. The resulting sludge thus thickened is transferred to a digester 16 to undergo anaerobic digestion which produces the digester gas. The resulting digested sludge may be conducted to disposal for instance by being transported out to sea or to a lagoon, or it may be subjected to further concentration such as by filtration or by centrifuge, delivering the resulting concentrated matter for disposal. The body of digested sludge in the digester is kept in a state of agitation by suitable well known devices indicated here only by the propeller device 16a promoting the conversion of the gasifiable sewage solids into gas, with about one-half of the total solids thus normally convertible.

In some instances, secondary treatment may not be required, in which case the dilute primary sludge from clarifier 10 alone will go to thickener 15 to attain its gel state of concentration before being sent to the digester.

Another mode of operation bypasses the primary clarification stage, delivering the raw sewage directly into the aeration treatment tank, so that eventually only one kind of sludge namely from clarifier 12 will reach the thickener with the resulting thickened sludge subsequently to be sent to the digester.

Whatever may be the type of raw sludge delivered to the thickener 15 for further concentration, the resulting sludge thickened to gel concentration and thus having substantially no freely releasable liquor left in it, is subjected to digestion while a substantial proportion of the sludge from the digester is recirculated.

After a suitable rate of recirculation is established and operating equilibrium is achieved, there results a digested sludge greatly reduced in volume as compared with the volume of digested sludge obtainable when the raw sludge alone is thickened to the gel state of concentration, all as will be furthermore explained.

The flowsheet of FIG. 1 will now be described in greater detail.

Raw sewage is supplied to the treatment system by a supply conduit 17 having a branch 18 provided with control valve 19 for delivering raw sewage to the primary clarifier tank 10, and another branch 20 with control valve 21 bypassing the primary tank for delivering raw sewage directly to a subsequent treatment stage such as the aeration tank 13. The primary settling tank has the usual rotary sediment raking structure 22 whereby the sludge is conveyed to the center of the tank for discharge as primary sludge through an underflow conduit 23 leading to the mixing station 14.

The primary effluent carrying non-settleable solids overflowing from the primary tank is received by the peripheral launder 24 of that tank for further delivery through a transfer conduit 25 leading to the inlet end of aeration tank 13 and provided with control valve 26. Controllable means for providing compressed air to the liquid body in the aeration tank are indicated at 13a.

Leading from transfer conduit 25 at the upstream side of control valve 26 there is a branch conduit 27 for discharging primary effluent through control valve 27a when secondary treatment is not required. Branch conduit 20 of the raw sewage supply leads into transfer conduit 25 downstream from the control valve 26.

A transfer conduit 28 delivers the biologically treated sewage from the aeration tank 13 to the secondary clarifier tank 12 equipped with sludge collecting structure generally similar to that of the primary tank 10. Accordingly, the flocculent matter or biological flocs settling in tank 12 discharge in the form of secondary sludge through underflow conduit 29, with a portion of the underflow being returned through conduit 30 as seed sludge to the influent end of the aeration tank at a rate governed by the setting of control valve 31.

A transfer conduit 32 carries secondary sludge to the mixing station 14. A portion of the treated sewage from the aeration tank in turn may be diverted to the mixing station through a branch conduit 33 provided with control valve 34. Another branch conduit 35 provided with control valve 36 may carry a portion of the secondary clarifier effluent to the mixing station. Controlling the flow through either one or both of the branch conduits 33 and 35 in conjunction with controlling valve 31 makes it possible to establish a desired state of dilution of the sludges in the mixing station in accordance with the controls required by the subsequent thickening operation and further to be set forth, whereby the state of gel concentration in thickener 15 is attainable.

The thickener 15 is in the nature of a settling tank wherein the bladed rotary raking structure significantly contributes to the thickening operation by providing a kneading and dewatering effect upon the sludge while moving it across the bottom of the tank. Also, this tank is specially dimensioned occupying only about $\frac{1}{10}$ of the area of the primary settling tank, in accordance with the control requirements governing the thickening operation whereby the raw sludges may be thickened to a gel state of concentration, furthermore to be described below.

A pump 37 in underflow conduit 38 transfers the thickened sludge mixture to digester 16 which has a discharge conduit 39. A branch conduit 40 carries digested sludge from the discharge conduit 39 from the system to disposal. A branch conduit 41 through a variable volume pump 42 or other suitable proportioning devices diverts or recirculates a required proportion of digested sludge back into the mixing station 14 and thus into the thickener, or if desired to the head end of the plant, or along both paths. Accordingly, branch conduit 41 equipped with control valve 42a leads from the digester to the mixing station, while a further branch conduit 43 through control valves 44 and 45 may return digested sludge to the raw sewage supply, and still another branch conduit 46 with control valve 47 may bring digested sludge to the inlet end of the aeration tank. In each instance of recirculation of digested sludge thus diverted, the respective digested sludge solids will reach the thickener in order that the mixture of raw sludge and digested sludge solids may be thickened together in tank 15 to provide the novel technical results of this invention in conjunction with the operation of digester 16.

It will be understood, however, that at variance with the flowsheet of FIG. 1 various alternatives are possible for effecting treatment of the sewage ahead of the thickener 15, for example sending part or all of the secondary sludge into the primary clarifier whereby the mixture of primary and secondray sludges may be effected there rather than in mixing station 14. The recirculating digested solids may be introduced variously as indicated and above described in FIG. 1.

Figure 3:
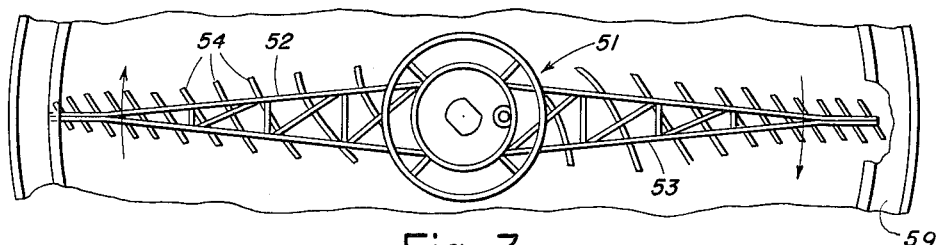
FIG. 3 is a plan view of the rotary structure in the thickening tank, showing the arrangement of sludge conveying raking blades.
Figure 2:
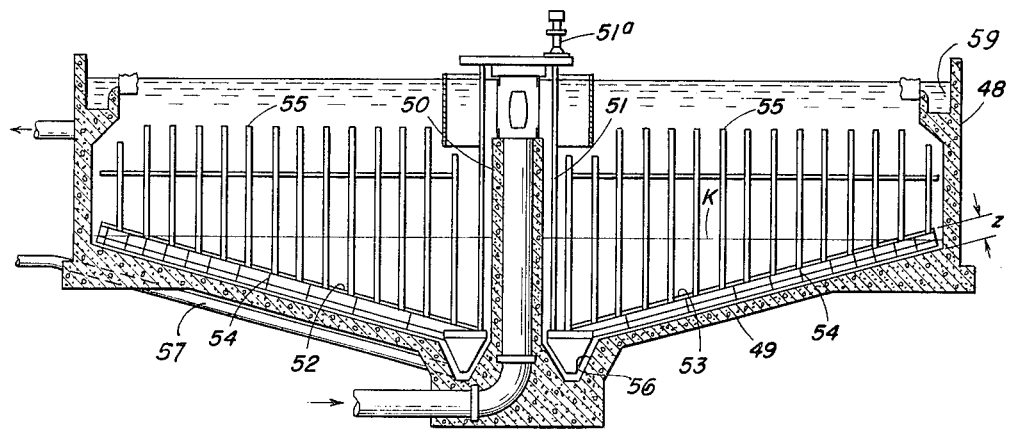
FIG. 2 is a greatly enlarged view of an example of the thickener showing details of its sludge raking and collecting mechanism.

FIGS. 2 and 3 provide a semi-diagrammatic illustration of the thickener structurally more fully implemented. Accordingly, there is the tank 48 proper having a shallow conical bottom 49 with a central pier 50 upon which is rotatably mounted the sediment conveying structure 51. This rotary rake structure suitably driven as by a motor unit 51a has a pair of arms 52 and 53 extending in opposite directions and provided at the underside with raking blades 54. In addition, each rake arm carries a row or rows or vertical thickening members 55 spaced horizontally from one another and effective to aid in the dewatering operation in the hindered settling zone.

An annular sludge sump 56 surrounding the foot end of the pier has an underflow discharge conduit 57 for pumping thickened sludge from the sludge bed indicated by the sludge level K.

Separated liquor or thickener effluent overflows into the peripheral launder 59 for discharge either (see FIG. 1) through a return conduit 60 and control valve 61 to the head end of the plant, or through discharge conduit 62 and control valve 63 to join the secondary effluent from the clarifier tank, or through both.

According to a preferred embodiment, the invention takes advantage of the thickening operation disclosed in the aforementioned Torpey patent, utilizing some aspects thereof in attaining the improved operation and the novel technical results.

The control of the earlier thickening process comprises maintaining within certain operating ranges:

(a) The relative solids detention time in terms of the sludge volume ratio which is the volume of sludge bed held in cubic feet divided by the volume of sludge pumped in cubic feet per day.

(b) The sludge bed depth in feet.

(c) The solids loading rate in terms of weight of dry solids per unit area per unit of time (lbs./sq. ft./day).

(d) The liquid loading rate in terms of liquid overflowing per unit area per unit of time (gals./sq. ft./day).

(e) The dilution or solids-to-liquid ratio of the feed sludge supplied to the thickener.

In the practice of this earlier thickening process, when thickening a particular type of sludge, there is selected a solids loading rate as well as a liquid loading rate in conjunction with a suitable sludge volume ratio or detention time. The liquid loading rate should be controlled to lie in a range wherein it is sufficiently high to prevent septicity and insufficiently high to cause undue loss of solids containment. The selected solids loading rate lies in a range having an upper limit beyond which excessive loss of solids containment and of solids concentration occurs, while the lower limit is represented by the solids loading rate below which the sludge bed depth becomes insufficient for determining the sludge volume ratio or relative solids detention time. The selected solids loading rate together with the selected liquid loading rate defines the dilution or concentration of the influent sludge to be thickened, whereas the selected solids loading rate in conjunction with the selected sludge volume ratio (SVR) defines a suitable sludge bed depth from which the highly concentrated sludge can be withdrawn in a state of gel concentration.

The above outlined control of the earlier thickening operation presents itself graphically in the thickening behavior curves in FIG. 9, with the sludge concentrations for various representative sludges plotted versus the solids detention time.

Accordingly, in the thickening tank the sludge solids will first settle relatively quickly as represented in the steeply rising and substantially linear initial portion of the curves. In this phase the solids settle while still relatively free from one another, the settling rate being a function of the size, the shape, and also of the specific gravity of the solids relative to that of the liquor, as well as a function of the viscosity of the liquor itself.

Thereafter, as represented by the intermediate bend portion or "break" in the curves, the solids become increasingly contiguous with respect to one another as they arrange and adjust themselves to one another in a thickening and compacting zone where the downward movement of the solids is accordingly retarded. Finally, at the tank bottom the sludge is subjected to the kneading action of the blades of the raking structure whereby the final consolidation of the sludge solids occurs achieving the aforementioned gel state of concentration, a condition substantially represented by the bend portion in the respective thickening behavior curve.

The various sludges themselves are described as follows in connection with the thickening behavior curves C–1, C–2, C–3, C–4 in FIG. 9.

Curve C–2.—Primary sludge

A primary clarifier sludge such as is representable by the behavior curve C–2 comprises the settable material present in the raw sewage, and removed to the extent of ⅓ to ⅔ of the total of suspended solids, with a solids detention time of 1 to 3 hours in the primary clarifier tank. For the purpose of this invention, what is herein termed primary clarifier sludge may include primary sludge obtained where primary clarification treatment is preceded by a short period aeration treatment or other kinds of treatment serving to improve flocculation and to so aid primary sedimentation. That is to say, such primary clarifier sludge would contain the normally settleable solids along with a portion of the normally non-settleable suspended solids.

Curve C–1.—Mixture of primary sludge and modified aeration sludge

A sludge mixture such as is representable by the behavior curve C–1 includes, in addition to the primary clarifier sludge, that kind of secondary treatment sludge that results from treatment of the primary clarifier effluent by the so-called modified or high-rate aeration process. As an overall result of these primary and secondary treatments there are removed from the raw sewage about 75% of the total suspended matter. In this secondary high-rate aeration treatment primary effluent is aerated in the presence of a small quantity of biologically active floc for a relatively short period of time, producing a secondary sedimentation sludge somewhat raw in character and similar to its thickening characteristics to sludge derived from what is today known as high-rate biological trickling filtration. It is this mixture of such secondary sludge with primary sludge that is to be subjected to the thickening process proposed by this invention, and it is thus that the behavior curve C–1 (FIG. 3) runs relatively close to the behavior curve C–2 of the primary clarifier sludge.

More specifically, the high-rate activated sludge process or modified aeration process is practiced by employing the following units of treatment, namely 1 hour of primary clarification followed by 2 hours of aeration of the primary effluent in the presence of a biologically active returned sludge whose solids age is about ⅓ day. The thus treated sludge is then subjected to 2 hours of final clarification in order to separate the biologically active and accreted raw solids which settle to form the return and excess sludges while clarified sewage overflows the final effluent weirs.

Curve C–3.—Mixture of primary sludge and activated sludge

A sludge mixture such as is representable by the behavior curve C–3 contains in addition to the primary clarifier sludge, the secondary sludge that results from the so-called conventional or full activated sludge treatment of the primary clarifier effluent. As a result of both the primary and the secondary treatment there are removed from the raw sewage 85% to 95% of all suspended matter. Such conventional aerobic treatment is generally understood to be a treatment whereby primary effluent is aerated in the presence of a relatively large quantity of biologically active floc and usually for a period of time much longer than required for the high-rate aerobic treatment of curve C–2.

More particularly, the primary sewage effluent liquor with its suspended colloidal and dissolved sewage matter representing about two thirds of the total BOD, passes through the aeration tank wherein it is subjected to aeration in the presence of previously activated biological flocs. Most of the suspended colloidal and dissolved matter is thereby flocculated and rendered settleable in the secondary clarifier yielding biological secondary sludge as well as clarified effluent discharged into the receiving waters. Enough oxygen in the form of compressed air is supplied to the contents of the aeration tank to support the biological utilization thereof in the propagation of the beneficial biological flora contained in the resulting flocs. The activated sludge thus obtainable is somewhat similar to sludge derived from conventional trickling filter operation in respect to its thickening characteristics.

Curve C–4.—Sludge derived from modified aeration without primary clarification In this instance the raw sewage is admitted directly to the aerating tank, there to mix with the biologically active return sludge containing solids whose age is about ⅓ day, and aerated for ½ to 2½ hours in the presence of the biologically active return sludge. The sludge mixture flowing from the aerating tank is conducted to the final clarifier where the biologically active solids and the accreted raw sewage solids are separated and settled to provide the return sludge and the excess sludge leaving the system, while clarified sewage liquid overflows from the final settling tanks.

The above described earlier thickening operation, resulted in large savings in digester tank volume requirements along with the elimination of the digester supernatant liquor problem and of the need for a secondary digestion stage, thus superseding the conventional two-stage digestion systems. In these two-stage systems a relatively dilute sludge derived from the clarifiers underflow is subjected to digestion in a primary digester tank where the major portion or nearly all of the digestible organic matter is converted into gas with the body of the sludge kept in a state of agitation. The resulting sluge still containing a residual portion of digestible matter is transferred to the secondary digester tank where only a relatively small portion of gas is produced and where quiescent conditions are desired to encourage the release of the supernatant liquor and to produce the digested sludge. With the aid of the above thickening operation a well digested sludge is obtainable directly from a primary digester at concentrations comparable to that resulting from an adequate and well operated two-stage digestion system. Therefore, the volume of the digested sludge going to disposal was equal to the volume of the raw sludge thickened to gel concentration.

In order to achieve a further reduction in the volume of the digested sludge it would be necessary to forcibly concentrate either the already highly thickened sludge mixture and/or the digested sludge, all of which would render the process impractical, uneconomical, or impossible.

The invention, however, produces a digested sludge of greatly reduced volume without extra cost, by way of providing a dilute sludge containing a large proportion of digested solids along with the raw solids, and subjecting that mixture to a thickening operation preferably so controlled that the resulting thickened sludge contains no freely releasable liquor. The resulting new thickened sludge mixture is then subjected to digestion. This procedure is accompanied by other technical and economical advantages, among which are further increased thickening and digestion efficiencies, increased sludge pumping and plant mainteniance efficiences, as well as a substantial alkalinity removal with respect to the digested sludge, all as will be furthermore described.

More in particular, digested sludge is recirculated at rates up to about two-thirds of the volume of the sludge discharging from the digester. The thickener in turn, if operated according to the invention, will yield digestible thickened sludge mixture containing the digested solids as by substitution, or exchange of these solids for interstitial water in the gel. The volume of the thickened sludge mixture remains therefore substantially the same as that which would result from thickening the dilute raw sludges alone.

Such a reduction in digested sludge volume is physically illustrated in FIGURES 5 to 8 described as follows:

In FIG. 5 which represents a volume V of raw sludge alone thickened to the aforementioned gel state of concentration, the raw sludge solids are designated 64. The gel state and hygroscopic lumpy character of the raw solids are further illustrated in the enlargement thereof shown in FIG. 5-A. In FIG. 6, a like volume V contains the corresponding amount of digested sludge solids 65 having a more or less fibrous skeletal character since the digestible organic matter has been converted into gas. But some residual undigested matter is also indicated by scattered particles 64a. FIG. 6-A again shows an enlargement of those fibers.

By comparison, FIG. 7 providing the identical volume V represents the thickened raw sludge volume of FIG. 5, additionally containing dispersed in the gel the recirculated digested solids 66. The enlargement in FIG. 7-A further illustrates the interstitial embodiment of the digested solids in the gel structure of the thickened sludge. FIG. 8 accordingly shows the solids mixture of FIG. 7 having undergone digestion, with a much larger number of total digested solids 67 crowded into the identical volume V. The corresponding enlargement of the sludge solids in FIG. 8-A further illustrates that condition as well as the absence of residual undigested matter emphasizing the higher digestion efficiency.

Referring to the operation of the flow sheet in FIG. 1, according to one embodiment, the digested sludge is recirculated directly to the thickening tank. According to another embodiment, the digested sludge may be recirculated through the clarification treatment process.

It was also found that recirculation by either route will have the effect of removing substantial amounts of alkalinity normally found in the digested sludge, thus benefiting a continuous filtration operation to which the digested sludge might be subjected for disposal. The alkalinity is thus removed, which would otherwise neutralize and render ineffective a corresponding amount of flocculating chemical usually applied to aid the filter operation.

Figure 4:
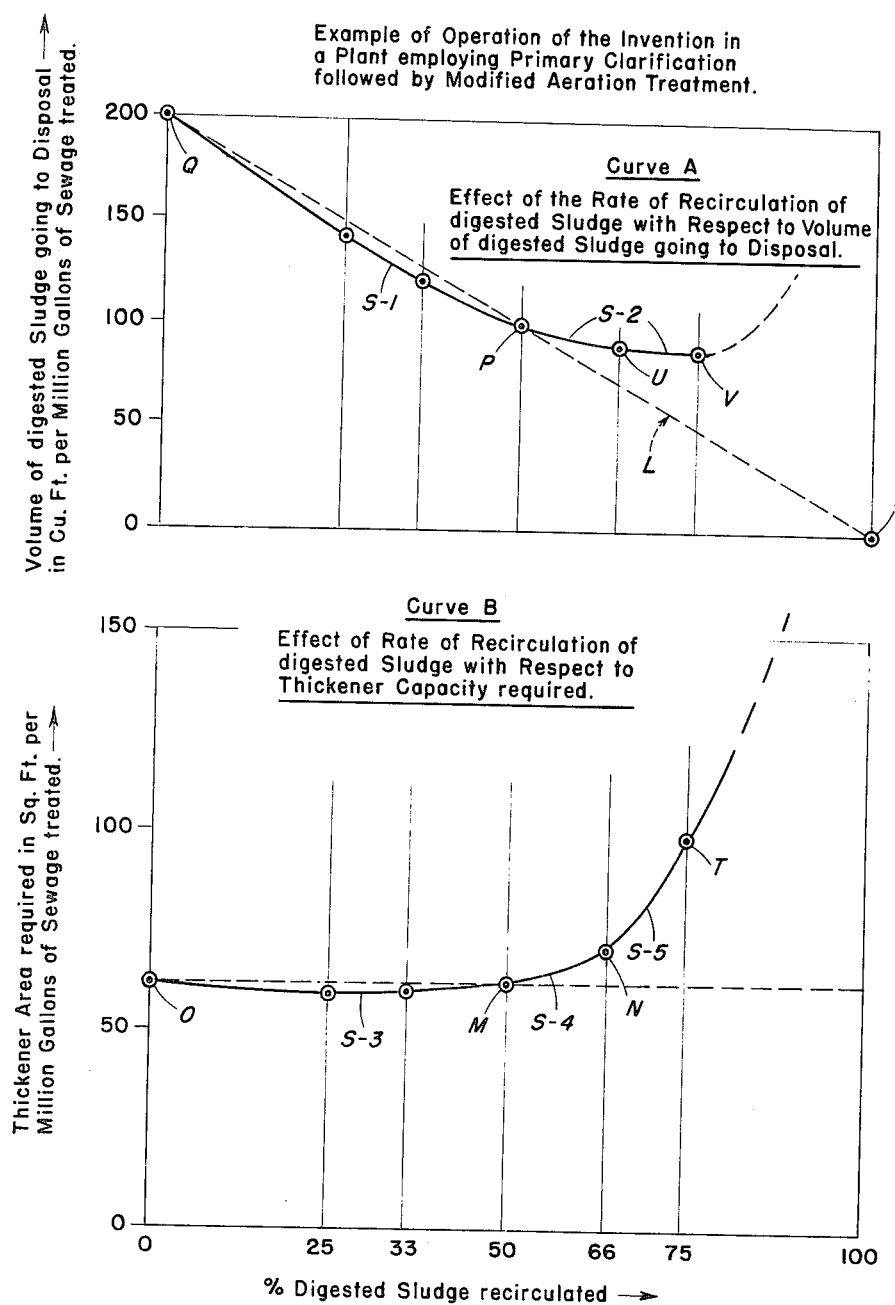
FIG. 4 shows two graphs indicating the effects of various rates of digested sludge recirculation upon the thickener-digester operation.

Since the invention requires controlled recirculation of digested sludge solids, there are shown in FIG. 4 certain graphs defining curves A and B representing the invention in terms of controlling the recirculation rate within ranges that are operatively feasible as well as economically desirable, while the associated thickener in turn is operated and controlled to deliver the mixture of kneaded and dewatered sludge solids in the gel state of concentration for transfer to the digestion stage.

In the example shown in FIG. 4, these graphs are derived from the operation of a "High Rate" or "Modified Aeration" treatment plant (see also the sludge behavior curve C–1 (FIG. 9) discussed above) presenting practical operating limits of recirculating rates in terms of the percentage of digested sludge discharging from the digester. A practical operating range is from about 25% to about 66% or roughly between ¼ and ⅔ of the digested sludge leaving the digester. These percentages appear on the abscissa for both curves A and B of FIG. 4, whereby the operation of the digester (curve A) and the operation of the thickener (curve B) are correlated to each other.

Curve A shows the sludge volume going to disposal as a function of the recirculation rate. More particularly, Curve A shows that for a zero recirculation rate there is produced a volume of 200 cubic feet of digested sludge per million gallons of sewage treated. But when the digested sludge is recirculated at increasing rates, this curve indicates that at about 25% recirculation the volume of digested sludge going to disposal was reduced to about 140 cubic feet per million gallons of sewage treated. When the recirculation rate was increased to about 75%, the volume of digested sludge going to disposal was reduced to a mere 90 cubic feet per million gallons. However, for a practical recirculation range from about 25% to about 66% as measured on the abscissa, the corresponding resulting volumes of digested sludge going to disposal were about 140 cubic feet and about 90 cubic feet respectively. A recirculation of 50% results in about 100 cubic feet of digested sludge going to disposal per million gallons of sewage treated.

The curve A may be considered in relation to the straight line L which in this example intersects curve A at an intermediate point P corresponding to about 50% recirculation. Accordingly, the upper portion S–1 of the curve between points P and Q generally follows the incline of line L, which means that substantially all the recirculated digested solids are incorporated in the gel structure of the thickened sludge without increase in the basic raw sludge volume. Below point P the lower portion S–2 of the curve between points V and U deviates upwardly from the line L indicating that with recirculation rates greater than about 50% the shrinkage of the final digested sludge is less than proportional although still significant up to about 66% recirculation at point U. This latter condition is explained by the fact that with recirculation rates above 50% there are more solids present than can be interstitially accommodated in the gel structure of the thickened raw sludge volume. Accordingly, the volume of the thickened mixture increases even though the digested sludge volume continues to shrink up to about 66% recirculation.

Curve B in FIG. 4 shows the relationship between digested sludge recirculation rate and thickener area required in square feet per million gallons of sewage treated. This curve shows that substantial increases in the thickener capacity are not required until the recirculation rate exceeds about 66%, and that thereafter a disproportionately large increase in thickener capacity is required to merely contain the solids in the thickener without affording significant advantage in reduction of the volume of digested sludge going to disposal.

In this curve, the point of origin O on the ordinate represents the thickener area used in a modified aeration treatment plant to thicken the sludge mixture containing the combined solids to the gel state of concentration. As the recirculation rate was increased from zero to an intermediate value about 50% there was no significant rise in the thickening area requirements as represented by the shallow initial portion S–3 between points O and M of the curve. From 50% to 66% recirculation there was a small increase in thickening area requirements as represented by the bend portion S–4 between points M and N of the curve due to the presence of greater amounts of digested solids in circulation. Thereafter, that is beyond 66% recirculation, there was required a disproportionately larger thickening area as represented by the steeply rising end portion S–5 between points N and T of the curve.

The operation of the invention will now be described by reference to the flow sheet in FIG. 1 employing both primary and secondary treatment of the sewage, the secondary treatment phase more specifically comprising Modified Aeration Treatment in aeration tank 13.

The operation therefore involves the thickening behavior curve C–1 along with associated thickening behavior curves in FIG. 10, as well as the curves A and B in FIG. 4 pertaining to the operating relationship between the digester and the thickener.

While the general purpose and function of the primary and secondary treatments in FIG. 1 as represented by primary clarifier 10, aerator 13, and secondary clarifier 12 are well known, it may be said that the treatment operation is so controlled as to yield a mixed primary and secondary sludge of a dilution suited to the control requirements of the subsequent thickening operation in tank 15, and from which a thickened sludge is to be withdrawn having substantially no freely releasable liquor, to be subjected to anaerobic digestion.

The primary and secondary sludges may be combined as shown in the mixing station 14 for delivery to the thickener, or they may be otherwise combined for instance by retransfer partially or wholly of the secondary sludge into the primary clarifier tank.

The dilute mixture of primary and secondary sludges thus being delivered to the thickener may have thickening characteristics representable by the previously described thickening behavior curve C–1 as shown in FIG. 9 and FIG. 10. The raw sludge is thickened continuously to a gel concentration corresponding to a point on a thickening behavior curve located substantially above the steeply ascending initial part thereof, with the raking blades providing a beneficial kneading action upon the bottom strata of the sludge for mixing and dewatering.

The thus thickened raw sludge of gel concentration is transferred substantially continuously to the digester 16, so that in due course there will be built up in this digester a constant body of anaerobically digesting sludge in digestion equilibrium. This body of digesting sludge is preferably subjected to forced agitation to provide uniform mixture of raw and digested solids therein. With about 50% to 60% of the volatile sewage matter usually converted into gas, the digester thus delivers a stabilized sludge containing only the usual small amount of residual undigested matter which at a solids concentration which represents the limit attainable under those conditions where freely releasable liquor is not present due to the dewatering effect of the preceding raw sludge thickening operation.

Once this initial operating equilibrium is established both in the thickener and in the digester, the aforementioned recirculation phase may be initiated. That is, a predeterminable substantial proportion of the volume of the digested sludge delivered by the digester is continuously diverted, and the thus diverted digested solids are admitted to the thickener.

When thickening this mixture, it is found that the relatively lower viscosity of the sludge mixture enhances the mixing, kneading, and dewatering effect of the raking blades, which results in the new high concentration of the mixed solids in the gel.

In due course then a new operating equilibrium will have established itself in the thickener as well as in the digester, with the digested sludge assuming a volume greatly reduced beyond the limit attainable in the preceding equilibrium phase having no such recirculation.

Referring now to curve A in FIG. 4, if a recirculation rate of about 50% has been initiated as indicated for example by the intermediate point P, the portion S–1 of the curve shows substantially proportionality between the amount of recirculation and the reduction in the volume of digested sludge going to disposal.

Under such conditions, the thickener capacity required need not be larger than that applicable for thickening without recirculation, this being indicated by portion S–3 between points O and M on curve B. In other words, the thickener will handle the additional digested solids load, because of its ability to produce a greater total solids concentration in the thickened sludge.

For practical purposes, however, minor increases in thickener capacity may be provided in order to accommodate recirculation rates greater than about 50% and up to about 66%.

In conducting the thickening operation as in the thickener shown in FIGS. 2 and 3, the level K of the sludge bed is preferably kept at an elevation where the sludge bed occupies substantially only the conical bottom portion of the tank, so as to maximize the kneading and thickening effect of the raking blades upon the sludge being moved down the slope of the cone.

In connection with the action of the raking blades it should be noted that the reduction of the sludge viscosity by this invention is of practical importance because it enhances the thickening effect of the blades. The lower sludge viscosity enables the sludge to move through the spaces between the blades while being transported to the point of withdrawal.

As previously stated, the sludge mixture of raw and digested solids has thickening characteristics representable by thickening behavior curves resembling those of the basic curve C–1. That fact is illustrated in FIG. 10 by a series of curves F–1 located outwardly from the basic curve, as well as by another smaller series of curves F–2 located inwardly from the basic curve. As the recirculation rate is increased up to about 50% the position of the respective curve advances outwardly to an extreme location. Further increases in the recirculation rate will cause the curves to regress from the extreme outer position towards the basic curve C–1 and even downwardly below that curve, the lowermost position being that below which no further reduction can be had in the volume of the digested sludge going to disposal.

The following tabulation of operating ranges of thickening control factors is a guide for conducting the thickening operation using recirculation of digested sludge:

TABLE A

This table shows operating ranges and results based upon year-round operation in thickening the sludges derived from various representation types of sewage treatment.

The raw sludges contain about 75% volatile matter including normal domestic and industrial waste components.

The range of usual sludge temperature is 55° to 80° F.

|  | A | B | C | D |
|---|---|---|---|---|
|  | Primary clarification treatment | Primary clarification followed by high rate secondary treatment | Primary clarification followed by conventional secondary treatment | High rate aeration treatment alone* |
| Concentration of thickened sludge, mixture, percent solids | 9–15 | 7–14 | 4–9 | 6–13 |
| Mixed solids loading rate, lbs./sq. ft./day | 10–40 | 8–35 | 4–20 | 7–30 |
| Liquid loading rate, gal./sq. ft./day | 500–1,500 | 500–1,500 | 250–1,000 | 500–1,500 |
| Relative mixed solids detention time measured by Sludge Volume Ratio (S.V.R.) | ¼–2 | ¼–2 | ¼–3 | ¼–2 |
| Sewage bed depth in ft. | 1–5 | 1–5 | 1–5 | 1–5 |

*In this case raw sewage is supplied directly to the aeration tank.

The ranges of results and control factors in the foregoing tabulation should be understood as indicating that the lower thickened sludge concentrations are associated with the higher solids loading rates as well as associated with lower sludge volume ratios. By the same token, the higher sludge concentrations are associated with lower solids loading rates as well as associated with relatively higher sludge volume ratios.

The liquid loading rate in this tabulation should generally tend towards the higher values of its range to accommodate the warmer sludges so as to discourage and prevent septicity, yet should tend towards the lower values where the lower thickened sludge concentrations are involved, so that undue loss of solids containment in the tank may be avoided.

Furthermore, this tabulation substantially applies for previously mentioned practical recirculation rates ranging up to about two-thirds of the digested sludge discharging from the digester. But if intermediate recirculation values, say, up to about 50% are preferred, the upper limit of the solids loading rates may be somewhat increased for the respective types of sludges as indicated by the following substitution in the above tabulation:

TABLE B

|  | A | B | C | D |
|---|---|---|---|---|
| Mixed Solids Loading Rates, sq. ft./day for 50% Recirculation | 10–50 | 8–40 | 4–20 | 7–35 |

During the starting phase of the operation while raw sludge only is available, the upper limits of the solids loading rates may be adjusted to suitable lower values maintainable until recirculation is initiated. Depending upon the selected rate of recirculation, these substitute values are as follows:

TABLE C

|  | A | B | C | D |
|---|---|---|---|---|
| Raw Solids Laoding Rate, lbs./sq. ft./day: |  |  |  |  |
| For subsequent 66% Recirculation | 10–20 | 8–17 | 4–10 | 7–15 |
| For subsequent 50% Recirculation | 10–30 | 8–25 | 4–12 | 7–20 |

The thickened raw sludge thus obtainable is transferred from the thickener into the digester tank to build up the body of digesting sludge in the tank. This operation is carried on until digestion equilibrium is attained producing the aforementioned volume of digested sludge having the aforementioned limit concentration.

With the initial equilibrium of the combined thickener-digester system thus established, a suitable recirculation rate is selected, and a corresponding proportion of the digested sludge discharging from the digester is diverted to admit the thus diverted sludge solids into the thickener. With the recirculation continued at that rate, a new operating equilibrium will be reached, yielding a thickened sludge of higher total solids concentration since it has digested solids embodied in the structure of its gel, and eventually yielding the aforementioned reduced volume of digested sludge for disposal.

In view of the fact that operating conditions will vary somewhat from plant to plant, it may become necessary to further adjust the various operating factors in such a manner as to realize the full economies and the practical technical advantages obtainable by the invention, largely with respect to savings in the cost of disposing of the digested sludge.

Besides reduction in the volume of the digested sludge far beyond the point heretofore attainable, the following additional highly practical advantages and novel technical effects are found to flow from the invention:

(a) In the operation of this invention, it was found that the concentration of the digested solids in the digester was increased by about 50% to 100% over that attainable in the above outlined earlier Torpey operation. Also it was found that the detention time in the digester of digestible sludge solids was increased substantialy relative to the liquid detention time.

(b) In the practice of the invention when the digested sludge is returned either via clarification, or directly through the thickener, it was furthermore found that the net weight of the alkalinity resulting from digestion was but ⅓ to ⅔ of the amount encountered in the above outlined earlier Torpey digester operation. Accordingly, the expense for coagulant chemicals in connection with continuous vacuum filtration of the digested sludge is reduced by about 33% to 66%. This may eliminate the construction and operation of the conventional elutriation facilities for the removal of excess alkalinity.

(c) It was further found that the sludge mixture was rendered less viscous by this invention, and acquired characteristics enabling it not only to thicken to the higher solids concentration but also to pass freely through spaces between the blades. This condition also facilitated the kneading and dewatering effect of the blades upon the sludge in its final phase of thickening while being moved towards the outlet point by the raking blades. Also, the lowering of the viscosity was found to avoid grease accummulation and consequent obstruction to the flow of the thickened sludge through the pipes.

The invention is furthermore substantiated by the following comparative plant scale operational examples from the Pollution Control Plant, Bowery Bay, New York, N.Y.:

EXAMPLE.—PLANT SCALE OPERATION
*Thickening and digestion operation without recirculation*

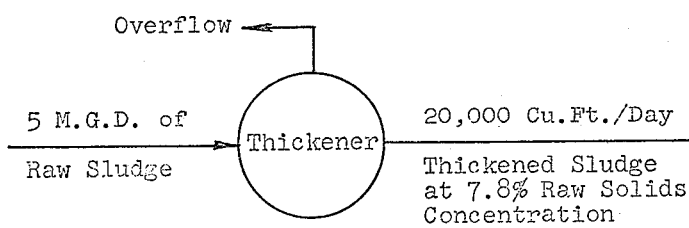
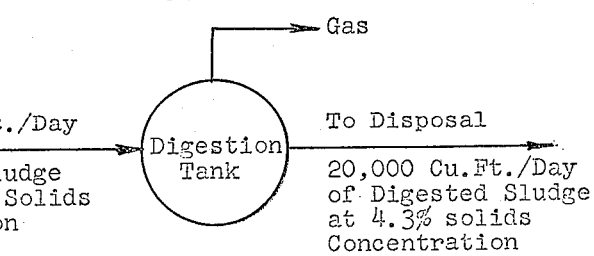

Sludge volume ratio (SVR)=.5
Thickener raw solids loading rate: lbs. solids/sq. ft./day=13
Thickener liquid loading rate: gals./sq. ft./day=650
Concentration of solids in raw sludge to be thickened =2400 p.p.m.

EXAMPLE.—PLANT SCALE OPERATION
*Improved thickening and digestion operation using 50% recirculation of digested sludge*

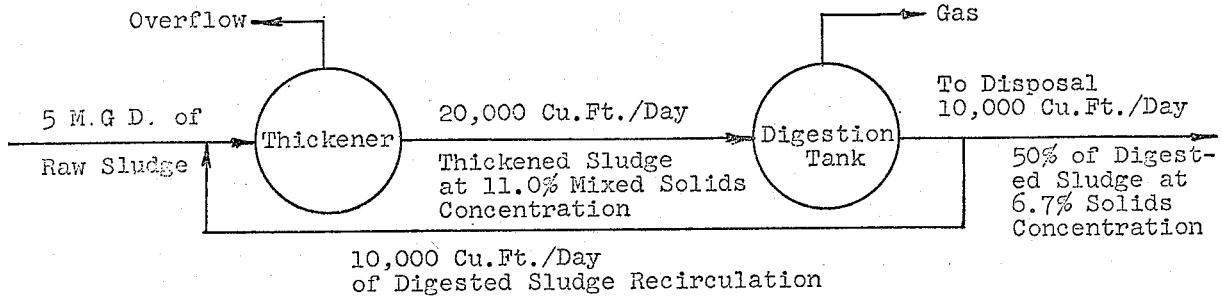
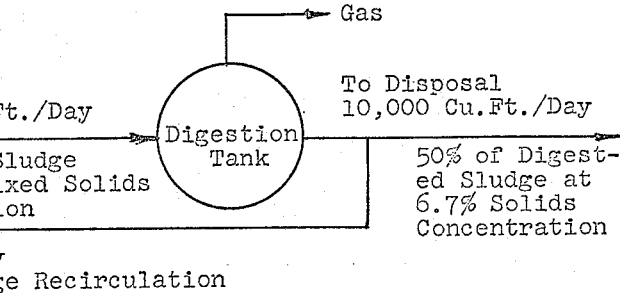

Sludge volume ratio (SVR)=.5
Thickener mixed solids loading rate: lbs. solids/sq. ft./day=19
Thickener liquid loading rate: gals./sq. ft./day=650
Concentration of solids in sludge mixture to be thickened =3500 p.p.m.

An adjustable device for controlling the proportion of recirculating digested sludge is illustrated in more detail in FIG. 11 described as follows:

Thickened sludge mixture is supplied to digester $16a$ via supply conduit $38a$ and pump $37a$. The digester has an overflow box $16b$ with a recirculating pipe $16c$ leading from the bottom of the box to a recirculating pump $42a$, and an overflow $16d$ located at the sludge level for discharging the undiverted portion of the digested sludge going to disposal. An alternate conduit $16e$ may be employed for withdrawing sludge from the digester for recirculation, with valve $V_1$ and $V_2$ operable accordingly.

A volume $Q_F$ of thickened sludge mixture from the thickening zone may be supplied to the digester at a constant rate per day by pump $P_1$. The recirculating pump $P_2$ which is a variable volume pump, is then adjusted to maintain a desired recycle rate preferably one to establish optimum operating conditions and minimizing the sludge volume $Q_D$ going to disposal. With 50% recirculation the diverted sludge volume $Q_D$ equals the volume $Q_D$ going to disposal. If the supply pump $P_1$ operates intermittently, then suitable electrical controls may be provided interlocking the pumps $P_1$ and $P_2$ in such a manner that the two will operate simultaneously, thereby maintaining the desired recycle rate.

The various pumps in the system of FIGS. 1 and 11 may be of the centrifugal—or the reciprocating—or the Moyno type, depending upon which is best suited for the particular purpose or requirements of the operation.

Since the invention in its preferred form aims to produce digested sludge reduced in volume due to the penetration of the digested solids into the interstitial water of the raw sludge, it will be understood that the operation of the thickener should be substantially continuous for attaining optimum results with respect to minimizing the volume of digested sludge going to disposal.

In the example according to the flowsheet in FIG. 1, it may be advantageous to introduce the recirculating digested sludge from the digester into a zone located a substantial distance below the liquid level and above the sludge bed in the thickener 15, as indicated by branch conduit $41a$ provided with control valve $41b$. This manner of introduction will promote the downward movement of recirculated solids and their flow toward the sludge withdrawal facilities of the thickening zone. Means may be provided for cooling the digested sludge prior to entry into the thickener. Accordingly, there is shown a cooling unit $41c$ which may be in the nature of a heat exchanger located in a bypass $41d$, connected to conduit 41, with valves $41e$, $41f$, and $41g$ operable to include the cooling unit in the return flow of digested sludge leaving the digester at an elevated temperature.

In the operation of the thickening phase of the invention, sludge may be withdrawn from the bottom of the thickening zone at a rate controlled by substantially continuous indications of the solids concentration in the thickened sludge delivered by the thickening zone. To this end, a suitable control device responsive to changes in solids concentration may regulate the sludge withdrawal rate or pump operation, so as to prevent the concentration of the thickened sludge from dropping below a predetermined value at which the invention is to operate. Such a density responsive control device is indicated at D in FIG. 1, control connections between it and pump 37 not being shown.

The solids concentration in the thickened sludge mixture can thus be held at a substantially stable value without incurring periods of excessive dilution. For concentration values to be held below or short of gel concentration the rate of recirculation of digested sludge may be adjusted so as to minimize the volume of the resulting digested sludge going to disposal. With such adjustment, a digested sludge containing substantially no freely releasable liquor is attainable.

When the solids concentration is held at a value where the thickened sludge mixture itself reaches a value where substantially no freely releasable liquor is present, then the volume of the resulting digested sludge going to disposal is even further reduced to an extent depending upon the rate of recirculation.

While the invention has been illustrated and described in a sewage treatment plant, it is not intended to be limited to the details shown, since various modifications and structural as well as operational changes may be made without departing from the spirit of the invention.

For example, in particular circumstances it may be desirable to have the thickening operation conducted in a thickening zone combined with the primary clarifier also receiving secondary sludge. The thickening zone may have the form of a depression in the bottom of the clarifier, for instance in the form of an enlarged cylindrical sump which is area-dimensioned for proper solids loading rates for thickening, and which zone is also deep enough to accommodate the bed of thickened sludge. A rotary sludge collecting structure operating on the clarifier bottom may have a downward extension operating in this thickening zone, effective to knead and thicken the sludge in the bed while moving the same to the point of withdrawal. Also, a density responsive control device similar to the one indicated at D in FIG. 1 may be provided controlling the operation of a sludge withdrawal pump in the manner and for purposes similar to those indicated above in connection with the embodiment of FIG. 1.

The recirculating digested sludge may then be admitted separate from the raw sewage into this unit in a region located a substantial distance below the liquid level of the clarifier, for instance at the clarifier bottom or in the region above the sludge bed in the thickening zone. This will promote the downward movement of recirculated digested solids and their flow towards the sludge withdrawal facilities of the thickening zone.

Furthermore, sludge dewatering means other than those herein disclosed and illustrated may be employed, capable of causing substantial amounts of digested solids to penetrate into the interstitial water of the raw sludge so that the digested sludge produced therefrom will contain no freely releasable liquor.

In summary, the objective of this invention is attainable by the following combination of operations or operating steps. First, the raw sewage is subjected to a clarification operation producing effluent and raw waste sludge containing raw putrescible solids and liquid. This raw waste sludge is subjected to further dewatering preferably in a sedimentation thickening zone to form a bed of thickened sludge in the presence of a substantial quantity of digested solids. This thickening operation is controlled to yield a sludge mixture preferably thickened to a gel state where substantially no freely releasable liquor is present in the sludge. A body of this sludge mixture is maintained in a state of anaerobic digestion, and has the thickened sludge mixture supplied thereto, while discharging therefrom digested sludge. Usually, this is a volumetric displacement operation in the sense that normally a volume of sludge entering the digester displaces an equal volume of digested sludge. A substantial proportion of the discharging digested sludge is diverted for recirculation, while the undiverted portion is going to disposal. The digested solids thus diverted are added to the raw sludge to form mixed sludge to be subjected to the above dewatering or thickening operation, thus effecting a marked reduction in the volume of the digested sludge going to disposal.

In the preferred embodiment, the invention demonstrates that raw sewage sludges containing added large proportions of digested solids, can be thickened effectively to a gel state of concentration, substantially without expansion in volume over that attainable by the raw sludge already thickened to gel concentration, and that the resulting thickened sludge mixtures can be effectively digested in a minimum of digestion space. Important operational advantages are furthermore attainable due to the decrease in viscosity in the thickened mixture even at high mixed solids concentration in the gel. The thus improved kneading action of the raking blades upon the sludge in the bottom zone improves thickening, sludge pumping, and digestion. The marked decrease in the volume of digested sludge obtainable without cost by this invention represents a radical advance in the art of sludge disposal.

It will be understood that the invention may also find useful application with other types of digestible sludges differing from the types described above.

Also, each of the elements described above, or two or more together, may also find a useful application in connection with treatment steps differing from those described above.

Without further analysis, the foregoing will so fully reveal the gist of the present invention that others can by applying current knowledge readily adopt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. The method of treating sewage to derive therefrom readily disposable digested sludge, which comprises subjecting the sewage to clarification treatment producing effluent and diluent settled raw sludge containing raw putrescible solids and liquid, adapted for anaerobic digestion to produce said digested sludge containing digested solids and liquid; feeding said raw sludge to a sedimentation thickening zone to form therein a bed of sludge in the presence of a substantial quantity of digested solids mixed with the raw solids, kneading the sludge in said bed and moving the sludge in said thickening zone to a discharge zone for withdrawal and removing separated liquid from said thickening zone; controlling the thickening operation so that said sludge bed yields said sludge mixture concentrated to a gel state; maintaining a body of sludge in a state of anaerobic digestion; feeding the thickened sludge mixture from said bed into said body of digesting sludge and discharging therefrom a corresponding volume of digested sludge; diverting a substantial proportion of said discharging digested sludge but not more than about two thirds thereof; adding sludge solids thus diverted to the raw sludge for joint thickening in said sedimentation thickening zone, and subjecting the raw sludge mixed with the solids of the digested sludge to the thickening and kneading effects in said sedimentation zone, thereby producing said thickened sludge mixture from said bed concentrated to a volume substantially the same as that of said raw sludge when thickened alone to its gel concentration but with the digested solids interstitially incorporated, while said controlled thickening and said digestion and said digested sludge recycle operation are maintained substantially continuously.

2. The method according to claim 1, wherein said proportion of digested sludge is diverted at a rate of about 50% of the volume of digested sludge leaving said body undergoing digestion.

3. The method according to claim 1, wherein said proportion of digested sludge diverted is in a range from about 25% to about 66% of the volume of digested sludge leaving said body undergoing digestion.

4. The method according to claim 1, wherein the diverted sludge is introduced into said thickening zone in the region directly above said bed of sludge.

5. The method of treating sewage according to claim 1, wherein at least a portion of the sludge solids thus diverted is introduced into said thickening zone by way of passage through preceding clarification treatment.

6. The method of treating sewage to derive therefrom readily disposable digested sludge, which comprises subjecting the sewage to clarification treatment producing effluent and dilute settled raw sludge containing raw putrescible solids and liquid, adapted for anaerobic digestion to produce said digested sludge containing digested solids and liquid; feeding said raw sludge to a separate sedimentation thickening tank to form therein a bed of sludge in the presence of a substantial quantity of digested solids mixed with the raw solids, kneading the sludge in said bed and moving the sludge in said thickening zone to a discharge zone for withdrawal while allowing supernatant liquid to overflow; controlling the thickening operation so that said sludge bed yields said sludge mixture concentrated to a gel state; maintaining a body of sludge in a state of anaerobic digestion; feeding the thickened sludge mixture from said bed into said body of digesting sludge and discharging therefrom a corresponding volume of digested sludge; diverting a substantial proportion of said discharging digested sludge but not more than about two thirds thereof; adding sludge solids thus diverted to the raw sludge for joint thickening in said sedimentation thickening zone, and subjecting the raw sludge mixed with the solids of the digested sludge thus diverted to the thickening and kneading effects in said sedimentation tank, thereby producing said thickened sludge mixture from said bed concentrated to a volume substantially the same as that of said raw sludge when thickened alone to its gel concentration but with the digested solids interstitially incorporated, while said controlled thickening and said digestion and said digested sludge recycle operation are maintained substantially continuously.

7. The method according to claim 6, wherein at least a portion of said diverted sludge is introduced into the thickening tank in mixture with raw sludge.

8. The method according to claim 6, wherein at least a portion of said diverted digested sludge solids is introduced into the thickening tank by way of passage through preceding clarification treatment.

9. The method according to claim 6, wherein at least a portion of said diverted digested sludge solids is introduced into the thickening tank by way of passage through preceding clarification treatment, and wherein said preceding treatment comprises aerobic treatment.

10. The method according to claim 6, wherein a portion of said diverted digested sludge is introduced into the thickening tank and another portion is introduced into clarification treatment preceding said thickening operation.

11. The method according to claim 6, wherein the sewage is subjected to aerobic treatment with subsequent clarification of the aerobically treated sewage to provide said waste sludge to be thickened, and wherein at least a portion of said diverted digested sludge is introduced into said aerobic treatment.

12. The method according to claim 6, wherein said proportion of digested sludge is diverted at a rate of about 50% of the volume of digested sludge leaving said body undergoing digestion.

13. The method according to claim 6, wherein said proportion of digested sludge diverted is in a range from about 25% to about 66% of the volume of digested sludge leaving said body undergoing digestion.

14. The method according to claim 6, wherein the diverted sludge is introduced into said thickening zone in the region directly above said bed of sludge.

15. The method according to claim 6, wherein said diverted digested sludge is subjected to cooling prior to entry into said thickening zone.

16. The method of treating sewage to derive therefrom readily disposable digested sludge, which comprises subjecting the sewage to clarification treatment producing effluent and dilute settled raw sludge containing raw putrescible solids and liquid, adapted for anaerobic digestion to produce said digested sludge containing digested solids and liquid; feeding said raw sludge to a separate sedimentation thickening zone to form therein a bed of sludge in the presence of a substantial quantity of digested solids mixed with the raw solids, kneading the sludge in said bed and moving the sludge in said thickening zone to a discharge zone for withdrawal while allowing supernatant liquid to overflow; controlling the thickening operation so that the resulting thickened mixed sludge concentration is maintained at a substantially stable value; maintaining a body of sludge provided from said bed in a state of anaerobic digestion; feeding the thickened sludge mixture from said bed into said body of digesting sludge and discharging therefrom a corresponding volume of digested sludge; diverting a substantial proportion of said discharging digested sludge but not more than about two thirds thereof; adding sludge solids thus diverted to the raw sludge for joint thickening in said sedimentation thickening zone, subjecting the raw sludge mixed with the solids of the digested sludge thus diverted to the thickening and kneading effects in said separate sedimentation zone, and controlling said proportion of diverted sludge and said concentration of the mixed sludge relative to each other so that the resulting digested sludge will have attained a state of concentration where it contains substantially no freely releasable liquor, said controlled thickening and said digestion and said digested sludge recycle operation being maintained substantially continuously.

17. The method according to claim 16, wherein at least a portion of the sludge solids thus diverted is introduced into said thickening zone by way of passage through preceding clarification treatment.

18. A system for the treatment and disposal of sewage, which comprises a clarification station for subjecting the sewage to clarification treatment producing raw waste sludge by sedimentation containing raw solids and liquid, as well as effluent; means for feeding sewage to said clarification station; means for controlling the rate of withdrawal of waste sludge from said clarification station to withdraw said waste sludge relatively dilute; a separate sedimentation tank for thickening said raw sludge to a gel state of concentration in a sludge bed maintainable at the bottom of said tank, provided with overflow means for effluent and with means for discharging from said bed sludge thus thickened, and further provided with structure for kneading and moving the thickened sludge in said bed to said discharge means, and with controllable means for withdrawing the sludge from said bed thickened to a gel state of concentration, means for feeding said raw waste sludge from said clarification station to said sedimentation tank, a digestion station for containing a body of sludge undergoing digestion; means for feeding the withdrawn thickened sludge from said sedimentation tank to said body undergoing digestion and discharging therefrom a corresponding volume of digested sludge; means for diverting a controlled proportion of the discharging digested sludge whereby said proportion is maintainable in a range of about 25% to about 75% of said discharging digested sludge; and means for substantially continuously returning digested sludge solids thus diverted to said sedimentation tank to provide a thickened sludge in the gel state of concentration with said digested solids incorporated therein.

19. The system according to claim 18, wherein said diverted sludge is introduced directly above said bed of sludge.

20. The system according to claim 18, wherein sludge density responsive means are associated with said sludge withdrawal means for controlling the sludge solids concentration.

21. The system according to claim 18, wherein means are provided for cooling the diverted digested sludge prior to the entry thereof into said sedimentation tank.

22. The system according to claim 18, wherein said means for returning the digested sludge solids comprise means for introducing at least a portion of said diverted sludge solids into said thickening tank by way of passage through preceding clarification treatment.

(References on following page)

References Cited by the Examiner

UNITED STATES PATENTS

| | | | |
|---|---|---|---|
| 2,442,241 | 5/1948 | Koruzo | 210—6 |
| 2,786,025 | 3/1957 | Lamb et al. | 210—5 |
| 2,850,449 | 9/1958 | Torpey | 210—10 |

FOREIGN PATENTS 1,162,158    4/1958    France.

OTHER REFERENCES

"The Dorrco Desludge System," Bulletin No. 6262, 1955, a publication of Dorr-Oliver Inc., Stamford, Conn., 16 pages.

Torpey I: "High-Rate Digestion of Concentrated Primary and Activated Sludge," Sew. and Ind. Wastes, vol. 26, April 1954, pp. 479–496.

Torpey II: "Loading to Failure of a Pilot High-Rate Digester," Sew. and Ind. Wastes, vol. 27, February 1955, pp. 121–148.

MORRIS O. WOLK, *Primary Examiner*.